Patented Oct. 2, 1945

2,386,111

UNITED STATES PATENT OFFICE 2,386,111

DITHIOFUROATES

Albert F. Hardman, Akron, Ohio, assignor to Wingfoot Corporation, Akron, Ohio, a corporation of Delaware No Drawing. Application January 5, 1944,
Serial No. 517,107

7 Claims. (Cl. 260—345)

This invention relates to primary aliphatic amine and similar primary amine salts of dithiofuroic acid and the preparation thereof.

Such amine salts of dithiofuroic acid are useful as accelerators of the vulcanization of rubber and rubber-like materials derived by polymerizing butadiene, with or without other polymerizable materials such as styrene, acrylonitrile, etc. According to the present invention, a simple and efficient method for preparing such amine salts has been discovered.

According to the invention, the amine salts of dithiofuroic acid are prepared by reacting furfural, sulfur, the primary amine and hydrogen sulfide.

The practice of the invention is illustrated by the following example.

Example

A mixture of 48 grams of furfural, 20 grams of sulfur and 50 grams of cyclohexylamine in 200 cc. of benzene was stirred rapidly and hydrogen sulfide was introduced, the mass being cooled slightly to maintain a reaction temperature of 45-50° C. Red crystals quickly began to separate. After the heat of reaction began to subside, the introduction of the hydrogen sulfide was continued for an additional ten minutes. The crystals were then filtered off, washed with benzene and dried. The yield was 117 grams, which was 97% of the theoretical yield of cyclohexyl ammonium dithiofuroate.

Various primary aliphatic amine salts may be similarly prepared by using the desired amine in place of the cyclohexylamine of the example, including saturated and unsaturated, straight and branched chain aliphatic amines. Also alicyclic or cycloaliphatic amines, and substituted aliphatic amines such as aralkyl amines, furfurylamine, tetrahydrofurfurylamine, etc. may be employed. For purposes of the present invention, benzyl, furfuryl, tetrahydrofurfuryl, etc. radicals may be considered to be substituted methyl radicals of the formula R—CH$_2$—, in which R is phenyl, furyl, tetrahydrofuryl, etc. Further examples of such primary amines are isopropylamine, n-butylamine, the ac-tetrahydronaphthylamines, allylamine, $\beta$-phenethylamine, ethylene diamine, etc. Cyclohexylamine works particularly well.

Various other solvents may be employed in place of the benzene of the example, such as ethyl acetate, alcohol or water.

Each primary amine group will react with an atom of sulfur and one mol each of furfural and hydrogen sulfide, as illustrated by the following equation in which cyclohexylamine is used:

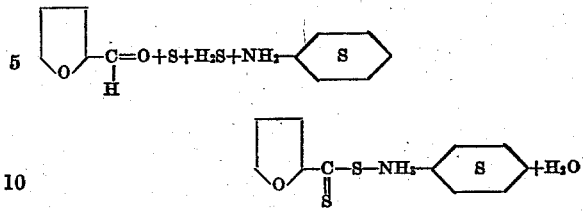

In the event that a polyamine, such as ethylene diamine, is used, either or all of the amine groups may be similarly transformed. In practice, an excess of hydrogen sulfide will ordinarily be used, and an excess of any of the reactants may be employed without affecting the generality of the reaction.

The reaction temperature should be kept below the decomposition temperature of the particular amine salt and the minimum temperature must obviously be sufficient to cause reaction. The temperature used will ordinarily be between 30° and 70° C. and temperatures in the neighborhood of 45-50° C. are quite satisfactory.

The compounds resulting from the process of the present invention are claimed in co-pending application Serial No. 517,108, filed January 5, 1944, and their use in rubber is described and claimed in co-pending application Serial No. 517,106, filed January 5, 1944.

What I claim is:

1. A process for preparing amine salts of dithiofuroic acid, which comprises reacting a mixture of furfural, sulfur, a primary aliphatic amine and hydrogen sulfide and recovering the resulting amine salt.

2. A process for preparing amine salts of dithiofuroic acid which comprises passing hydrogen sulfide into a mixture of furfural, sulfur and a primary aliphatic amine and recovering the resulting amine salt.

3. A process for preparing mono alkyl ammonium dithiofuroates which comprises reacting a mixture of furfural, sulfur, a primary alkyl amine and hydrogen sulfide and recovering the resulting amine salt.

4. A process for preparing a monoalicyclic ammonium dithiofuroate which comprises reacting a mixture of furfural, sulfur, a primary alicyclic amine and hydrogen sulfide and recovering the resulting amine salt.

5. A process for preparing a monoaralkyl ammonium dithiofuroate which comprises reacting a mixture of furfural, sulfur, a primary aralkyl-amine and hydrogen sulfide and recovering the resulting amine salt.

6. A process for preparing cyclohexylammonium dithiofuroate which comprises reacting a mixture of furfural, sulfur, cyclohexylamine and hydrogen sulfide and recovering the resulting amine salt.

7. A process for preparing amine salts of dithiofuroic acid, which comprises reacting a mixture of furfural, sulfur, hydrogen sulfide and a primary amine selected from the group consisting of aliphatic amines, cycloaliphatic amines, aralkylamines, furfurylamine and tetrahydrofurfurylamine, and recovering the resulting amine salt.

ALBERT F. HARDMAN.